United States Patent [19]

Iijima

[11] 4,108,337
[45] Aug. 22, 1978

[54] QUANTITATIVE SUPPLY APPARATUS OF POWDER COLORING AGENT

[76] Inventor: Tadashi Iijima, 4-22, Daita 3-chome, Setagaya-ku, Tokyo, Japan

[21] Appl. No.: 731,581

[22] Filed: Oct. 12, 1976

[30] Foreign Application Priority Data

Oct. 27, 1975 [JP] Japan .................................. 50-128372

[51] Int. Cl.² ......................... B65D 83/06; B67D 5/54
[52] U.S. Cl. ................................... 222/194; 222/307; 222/334; 222/363
[58] Field of Search .................. 222/48, 194, 307, 308, 222/334, 363; 92/137

[56] References Cited

U.S. PATENT DOCUMENTS

| | | | |
|---|---|---|---|
| 2,779,502 | 1/1957 | Ackerman | 222/308 X |
| 2,800,419 | 7/1957 | Kough | 222/194 |
| 3,140,018 | 7/1964 | Miller | 222/363 X |
| 3,228,065 | 1/1966 | Cournoyer et al. | 366/76 |
| 3,267,816 | 8/1966 | Graham | 92/137 X |
| 3,267,817 | 8/1966 | Adams | 92/137 X |

FOREIGN PATENT DOCUMENTS 1,258,840  1/1968  Fed. Rep. of Germany ........... 222/194

*Primary Examiner*—Robert B. Reeves
*Assistant Examiner*—David A. Scherbel
*Attorney, Agent, or Firm*—J. Gibson Semmes

[57] ABSTRACT

The quantitative supply apparatus of powder coloring agent can measure the powder coloring agent through a measuring groove provided on a rotary shaft and supply it directly to the raw material inlet opening of an injection moulding machine. The measuring groove on the rotary shaft can be adjustably changed properly in volume along a length direction. A container for the coloring agent is disposed on the top portion thereof and a hole in the bottom portion of the container is in contact, in a location covering the measuring groove, with the top portion of the rotary shaft. The coloring agent which has dropped from the measuring groove through the rotation of the rotary shaft is adapted to be introduced to the inlet opening of an ejector, and furthermore to the be supplied out of an exhaust side of the ejector to the inlet opening of the injection moulding machine through compressed air.

1 Claim, 6 Drawing Figures

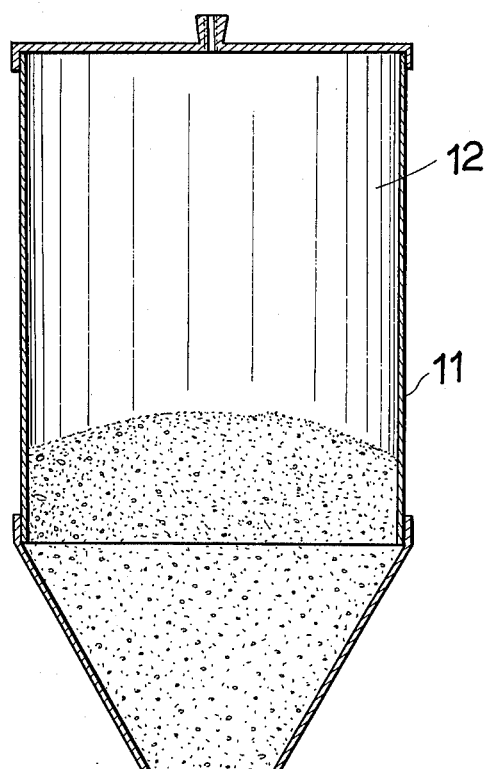
FIG.2
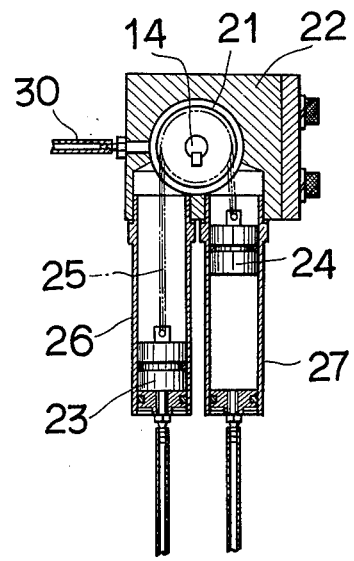
FIG.3
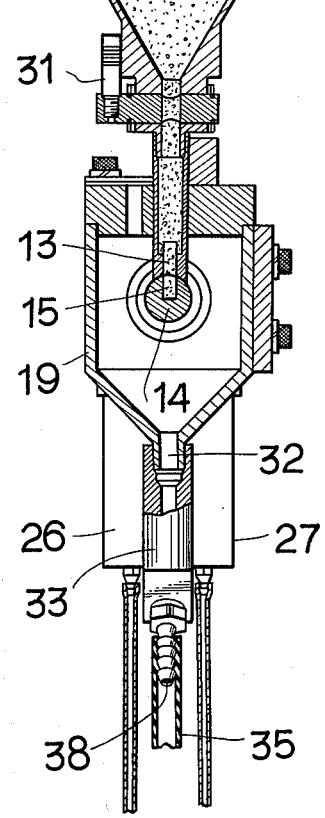

QUANTITATIVE SUPPLY APPARATUS OF POWDER COLORING AGENT

SUMMARY OF THE INVENTION

The present invention relates to a quantitative supply apparatus of powder coloring agent which is capable of automatically measuring powder coloring agent and supplying it directly to the raw material inlet opening of an injection moulding machine.

In order to process colored products during the conventional moulding processing of synthetic resin, etc., colored pellets as precolored raw materials were supplied to the hopper of an injection moulding machine so that colored products might be injectingly moulded. Accordingly, in order to produce the colored pellets, a plurality of raw materials such as colored agent, etc. had to be measured respectively, and to be mixed sufficiently by means of a mixing machine such as ball mill or mixer, etc. Furthermore, an apparatus for pelleting operation has to be provided by use of an extruding machine. However, it required several hours to tens of hours to produce the colored pellets. Accordingly, this became a big obstacle in flowing operation during the moulding processing of synthetic resin products. In addition, the coloring agent was scattered during the measuring operation, thus making working circumstances worse extremely.

Accordingly, it is an object of the present invention is to provide a quantitative supply apparatus of powder coloring agent which is capable of automatically measuring the powder coloring agent without use of a mixing machine such as ball mill, mixer, etc. or the other special apparatus in the moulding processing of the synthetic resin products, and supplying the powder coloring agent directly to the raw material inlet opening of the injection moulding machine.

Another object of the present invention is to provide a quantitative supply apparatus of powder coloring agent which is capable of measuring any desired amount of coloring agent respectively through one operation of a rotary shaft.

A still another object of the present invention is to provide a quantitative apparatus which is superior in dispersibility of the powder coloring agent into the raw materials.

A further object of the present invention is to provide a quantitative supply apparatus of powder coloring agent which is small in size and simple in construction, and is useful in the prevention of pollution without polluting the working circumstances.

These and other objects and the novel characteristics of the invention can be apparent from reading of the following detailed description with reference to the accompanied drawings. However, the drawings are provided mainly for reading, but are not intended to limit the scope of the invention.

BRIEF DESCRIPTION OF THE DRAWINGS

FIG. 2 is a cross-sectional view taken along a line II—II of FIG. 1.

FIG. 3 is a cross-sectional view taken along a line III—III of FIG. 1.

DESCRIPTION OF PREFERRED EMBODIMENTS

Figure 1:
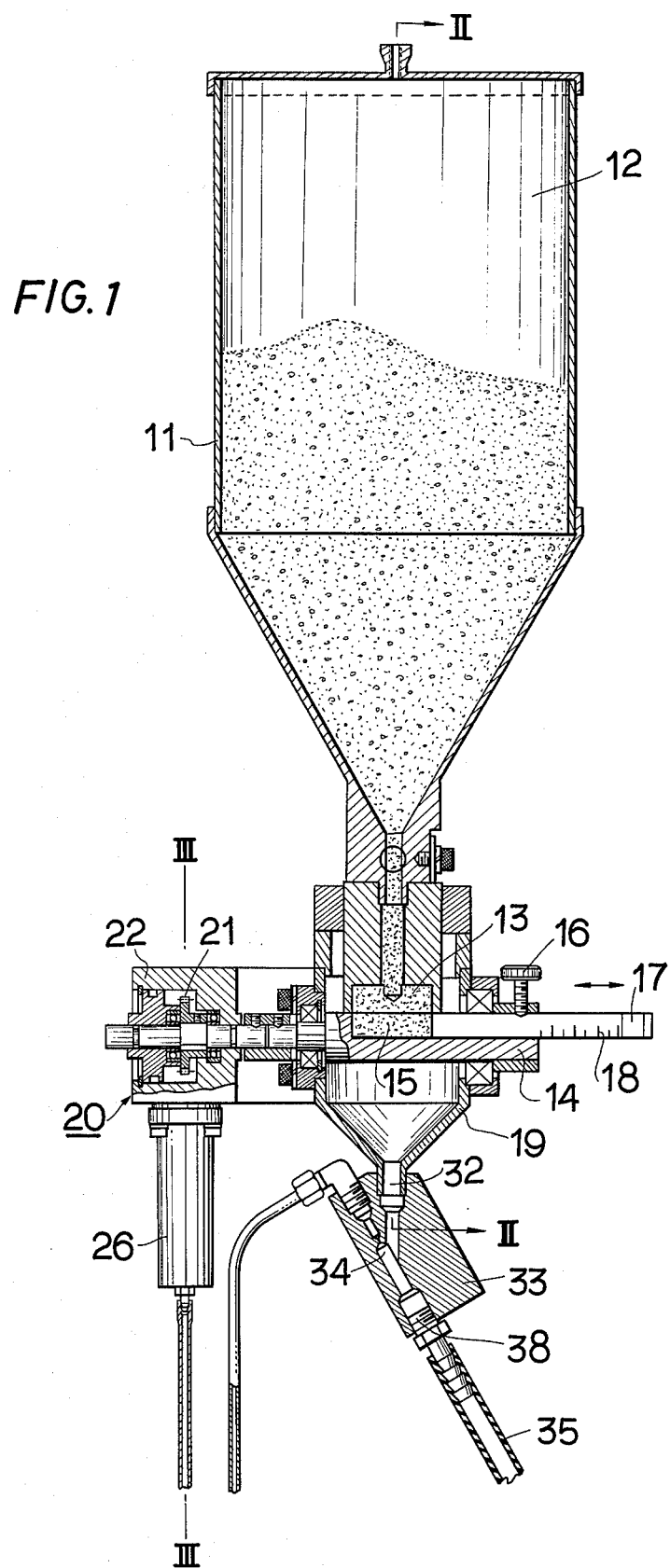
FIG. 1 is a vertical section of a quantitative supply apparatus of powder coloring agent showing a preferred embodiment of the present invention.

First, the embodiment of the present invention shown in FIG. 1 to FIG. 4 will be described hereinafter. A container 11 of the coloring agent is provided, in its upper portion, with an inlet opening 12 for the coloring agent, and, in its bottom portion, with a discharge opening 13 for the coloring object. The discharge hole 13 is formed to be approximately funnel-shaped and is, in its bottom end portion, in contact with the outer periphery end face of a rotary shaft 14 disposed under the discharge opening 13, opening towards the outer peripheral face side of the rotary shaft 14. Namely, the opening portion of the discharge hole 13 is in contact with the outer peripheral face of the rotary shaft so that it may be blockaded by the outer peripheral face. The rotary shaft 14 is provided, on its outer peripheral face, with a measuring groove 15 which conforms to the opening portion of the discharge hole 13 of the container 11. When the opening portion 13 has conformed to the measuring groove 15 through the rotation of the rotary shaft 14, the powder coloring agent is adapted to drop into the measuring groove 15 from the side of the discharge hole 13 of the container 11. The measuring groove 15 is normally secured on the rotary shaft 14 by a stationary screw 16 and can be adjustably changed properly in its volume by means of an adjustable rod 17 which is slidable axially. Namely the stationary screw 16 is loosened to advance or retreat the adjustable rod 17, in the direction of an arrow, along an axis on the rotary shaft 14 so as to increase or decrease the volume of the measuring groove 15 so that the desired amount of the coloring agent may be measured properly. Accordingly, measuring graduations 18 are carved on the end face of the adjusting rod 17. However, in a given position of the rotary shaft 14, namely, in a condition where a measuring groove 15 is located in the upper portion of the rotary shaft 14, the powder coloring agent is measured in the measuring groove 15 and the powder coloring agent placed inside the measuring groove 15 is dropped into a receiving receptacle 19 through the rotating operation of the rotary shaft 14. The portion of the measuring groove 15 of the rotary shaft 14 together with the lower end portion of the container 11 is adapted to be accommodated sealingly inside the receiving receptacle 19. As the measuring operation of the rotary shaft 14 is effected inside the receiving receptacle 19 as a sealing container, the surrounding circumstances are prevented from getting dirty due to the scattering of the powder coloring agent during the measuring operation.

In this embodiment, the rotary shaft 14 is driven by means of an air cylinder 20. Namely, the one end side of the rotary shaft 14 with a sprocket 21 on its outer peripheral face projects outwards from the receiving receptacle 19 and furthermore is accommodated within the casing 22 of the air cylinder 20. A chain 25 is interlocked with the sprocket 21 of the rotary shaft 14, which is accommodated inside the casing 22, the chain being tensilely driven by pistons 23 and 24. Compressed air is fed alternately to cylinders 26 and 27, which accommodate pistons 23 and 24 respectively, to drive the pistons 23 and 24 so that the rotary shaft 14 may be rotated through the chain 25. In this case, one stroke of from top dead center to bottom dead center of each piston 23 and 24 is adapted to conform to one rotation or 180° rotation of the rotary shaft 14. Namely, in the given position of such rotary shaft 14 as shown in FIG. 3, upon supplying of the compressed air onto the side of the cylinder 26 (left side in the drawing), the piston 23 is raised and simultaneously the piston 24 on the cylinder 27 (right side in the drawing) descends to rotate the rotary shaft 14 by 180° and to position the measuring groove 15 side of the rotary shaft 14 under the rotary shaft 14. On the other hand, upon supplying of the compressed air onto the side of the cylinder 27, the piston 24 is raised and simultaneously the piston 23 on the cylinder 26 descends to restore the rotary shaft 15 to the given position. The powder coloring agent is continuously measured through the 180° rotary action of the rotary shaft 15 and is automatically dropped into the receiving receptacle 19.

Figure 4:
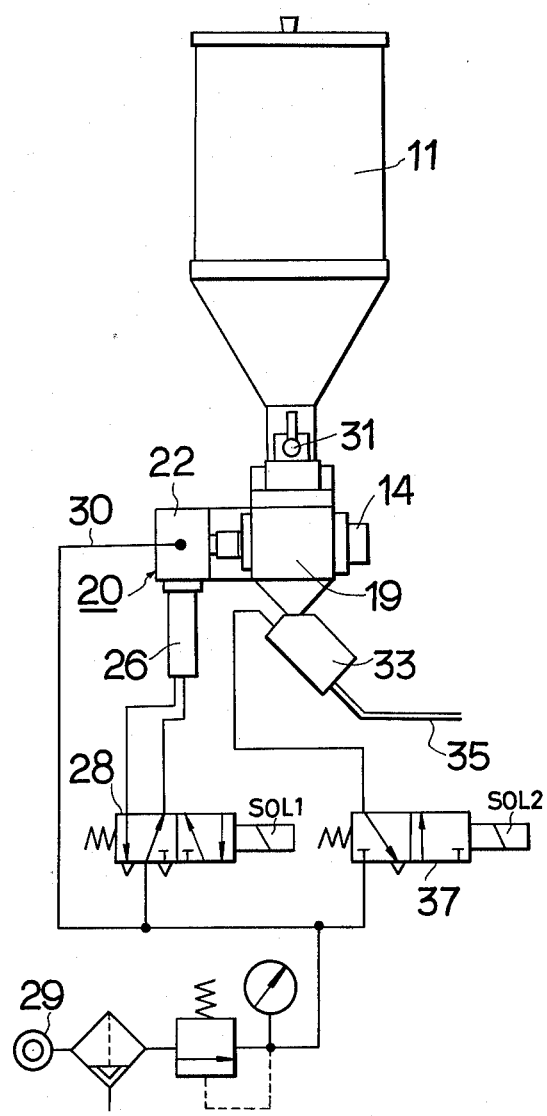
FIG. 4 is a piping view of the quantitative supply apparatus of powder coloring agent in accordance with the present invention.

The air cylinder 20 is connected to an air pressure source 29 through a change-over valve 28 and is adapted to be driven through the compressed air supplied from the air pressure source 29. Numeral 30 is a piping through which the compressed air is usually fed into the air cylinder 20 through a casing 22, as in FIG. 3. With the rotation driving method of the rotary shaft 14, the other means such as oil pressure motor, electric motor, etc. instead of the air cylinder 20, can be used. Numeral 31, FIG. 4, is a switching lever, which closes the discharge hole 13 side of the container 11 during the inoperative time of the quantitative supply apparatus of the present invention, or during the supplying operation of the coloring agent into the container 11, or during the exchanging operation of the coloring agent, so as to prevent the coloring agent from dropping. The receiving receptacle 19 is approximately funnel-shaped. The discharge hole 32 in the lower end portion thereof is connected to the inlet side 34 of the ejector 33. The powder coloring agent is measured in the measuring groove 15 of the rotary shaft 14, and drops into the receiving receptacle 19 so that it may be introduced into the inlet side 34 of the ejector 33 from the discharge hole 32 of the receiving receptacle 19. The ejector 33 is adapted to feed the powder coloring agent, which is introduced to the inlet side 34, through a piping 35 to the injection moulding machine 36 side (described later). The compressed air is supplied through a change-over valve 37 from the pressure source 29. The coloring agent from the exhaust side 38 is adapted to be fed, along with the compressed air, to the inlet hole 39 of the injection moulding machine 36 as in FIG. 5. As the powder coloring agent along with the compressed air is fed to the inlet hole 39 of the injection moulding machine 36, air eddy flowing is caused in the inlet hole 39 to increase the dispersibility of the coloring agent into the raw material so that the powder coloring agent may be mixed with the raw material uniformly.

Figure 5:
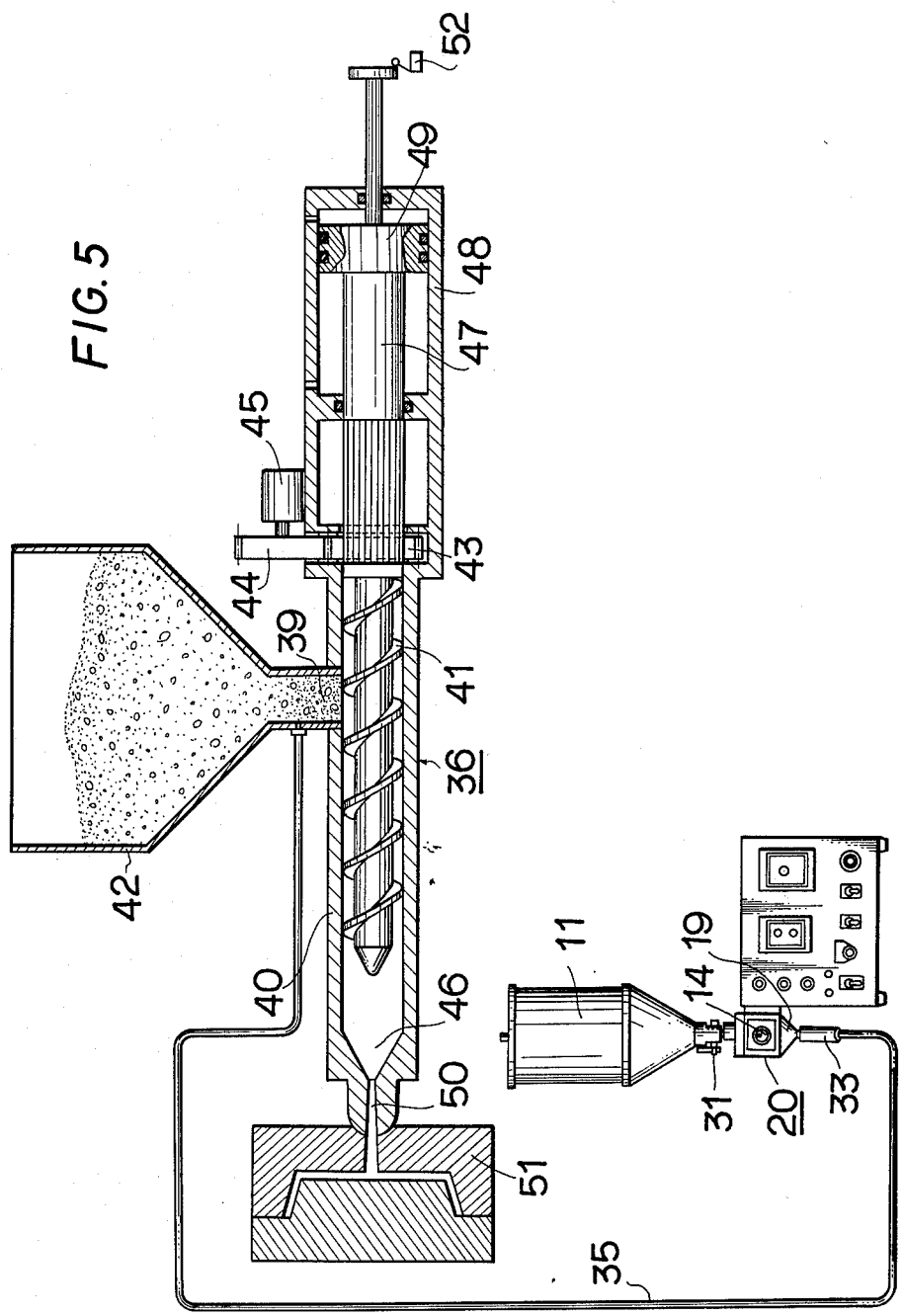
FIG. 5 is a vertical sectional view showing an injection moulding machine provided with the quantitative supply apparatus of the present invention.

FIG. 5 is a vertical cross-sectional view of the injection moulding machine which is provided with the quantitative supply apparatus of powder coloring agent of the present invention. Referring to FIG. 5, the injection moulding machine 36 has a screw 41 inside its body 40 and is provided, on its body, with a hopper 42 for the raw material. The screw 41 is connected through gears 43 and 44 with the oil motor 45 and is rotatably driven by the oil motor 45. The powder coloring agent is mixed with the raw material in the lower end portion of the hopper 42 and is absorbed from the inlet hole 39 into the body 40 of the injection moulding machine 36 to move to the front end hollow portion 46 of the body 40 through the rotation feeding operation of the screw 41. Also, the screw 41 is provided, in its rear end portion 47, with an injection cylinder 48. Namely, the rear end portion 47 of the screw 41 functions, also, as the piston for an injection cylinder 48 and is secured to the rum 49 of the injection cylinder 48. Accordingly, the screw 41 is adapted to properly advance or retreat inside the body 40 through the reciprocating motion of the rum 49. However, the synthetic resin product moulding material which has been fed into the front end hollow portion 46 of the body 40 through the advancing motion of the screw 41 can be pressed into a forming mold 51 through a through hole 50 in the front portion of the body. Numeral 52 is a limit switch which effects the stroking operation of the rum 49 and the switching-over operation of sliding direction.

Figure 6:
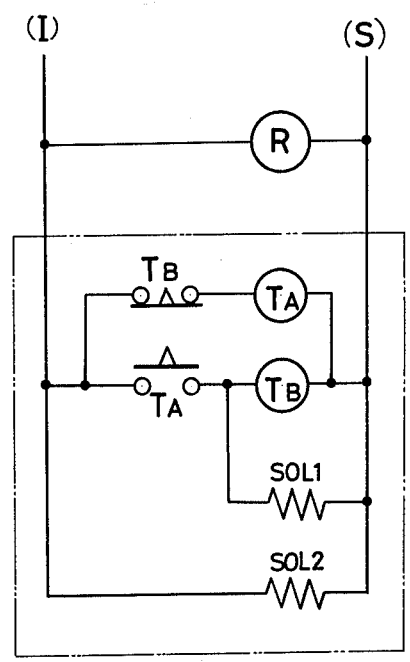
FIG. 6 is an electric circuit diagram showing a method of controlling the operation of the quantitative supply apparatus of the powder coloring agent of the present invention.

The operation and the operation timing of the quantitative supply apparatus for the powder coloring agent and the injection moulding machine are performed manually or automatically in accordance with a predetermined programming. FIG. 6 is a control circuit diagram showing one example. Namely, in the injection cylinder 48 of the injection moulding machine 36, the screw 41 rotates upon retreating of the rum 49. Hydraulic change-over valves (not shown) operates by energizing operation of a relay R in the control circuit on the side of the injection moulding machine 36 and are hydraulically driven respectively. The quantitative supply apparatus for powder coloring agent in accordance with the present invention is automatically operated within the time period of the energizing operation of the relay R. In FIG. 5, a power supply is obtained from I and S phases of the relay R. Accordingly, a timer TA is energized through a contact TB during the energizing operation of the relay R and also a coil SOL 2 is energized. The coil SOL 2 is a coil portion in the change-over valve 37 of the compressed air used for feeding the powder coloring agent into the injection moulding machine 36 so as to feed the compressed air to the ejector 33 through energization. Accordingly, the compressed air is normally kept supplying to the ejector 33 while the relay R is energized. A timer TA is in an energized condition. After the energization time is over, a contact TA closes, and a timer TB and a coil SOL 1 which is connected in parallel thereto are energized and operated. The SOL 1 is a coil portion in the change-over valve 28 for changing over the operation of the air-cylinder 20, which drops the powder coloring agent into the receiving receptacle 19, after the powder coloring agent has been dropped into the measured in the measuring groove 15 of the rotary shaft 14 by the powder coloring agent container 11. The coil SOL 1 rotates the rotary shaft 14 by 180° through energization. The timer TB is conductive. After the setting time thereof, is over, the contact TB opens, thus rendering the timer TA non-conductive. Accordingly, the contact TA returns to its original 'open' condition. As the timer TB and the coil SOL 1 become non-conductive, the contact TA closes to return the air-cylinder 20 to its original position, and the rotary shaft 15 returns to its a given position.

When the relay R is kept conductive continuously, the timer TA is energized again through the contact TB to effect the above operation. Acccordingly, the rotary shaft 15 effects revolving rotation intermittently and repeatedly, in accordance with the setting time of the timers TA and TB, by the air cylinder 20 while the relay R is conductive.

The setting time of the timers TA and TB can be determined properly in accordance with the moulding performance of the injection moulding machine which is provided with the quantitative supply apparatus for the powder coloring agent in accordance with the present invention.

As described hereinabove, acccording to the quantitative supply apparatus of the present invention, the coloring agent amount required for the one moulding operation of the synthetic resin product can be supplied in several distributions within the raw material inletting time of the operating cycle of the injection moulding machine 36. Furthermore, as only the powder coloring agent inside the measuring groove 15 on the rotary shaft 14 is fed into the raw material, the uniformed supply amount is provided, ensuring equally-colored mouldings all the time. Accordingly, no color-mixing controlling is required. Also, as the apparatus is simplified, color-changing is easier. At the same time, the coloring agent is measured in a hermetically sealed container 11, and thus is prevented from being scattered outside, thus useful in prevention of the working circumstances pollution hazards.

It is apparent that widely different embodiments can be constituted without departing from the spirit and scope of the present invention. The present invention is not restricted to the specified embodiment unless it is limited in accompanied claims.

What is claimed is:

1. A quantitative supply apparatus of powder coloring agent comprising:
    (A) a container, said container defining a lower end discharge opening;
    (B) a rotary shaft having ends, a portion of one end of the shaft being in contact with the lower end discharge opening of said container and said shaft having a measuring groove defined therein, said groove being adjacent the portion of the shaft which is in contact with the discharge opening of the container;
    (C) a regulating rod secured to and extending through the other end of the shaft, and extending into the measuring groove thereof, said rod being adjustably slideable, relative to the axis of the rotary shaft to vary the volume of the groove;
    (D) a receiving receptacle defining a lower end discharge opening, said receptacle sealingly contacting both the measuring groove of said shaft and the lower end discharge opening of the container;
    (E) an ejector having connection with the discharge opening of said receiving receptacle, said ejector defining an inlet and outlet; and
    (F) a compressed air conduit connected to the inlet of the ejector and to the outlet thereof.

* * * * *